(12) United States Patent
Ryon et al.

(10) Patent No.: US 11,635,027 B2
(45) Date of Patent: Apr. 25, 2023

(54) FUEL SYSTEMS FOR TORCH IGNITION DEVICES

(71) Applicant: Delavan Inc., Des Moines, IA (US)

(72) Inventors: Jason Ryon, Carlisle, IA (US); Lev Alexander Prociw, Johnston, IA (US); Brandon P. Williams, West Des Moines, IA (US)

(73) Assignee: Collins Engine Nozzles, Inc., Des Moines, IA (US)

( * ) Notice: Subject to any disclaimer, the term of this patent is extended or adjusted under 35 U.S.C. 154(b) by 0 days.

(21) Appl. No.: 16/951,631

(22) Filed: Nov. 18, 2020

(65) Prior Publication Data

US 2022/0154932 A1    May 19, 2022

(51) Int. Cl.

| | |
|---|---|
| *F02C 7/264* | (2006.01) |
| *F23R 3/36* | (2006.01) |
| *F02P 21/00* | (2006.01) |
| *F23Q 9/00* | (2006.01) |
| *F02C 7/266* | (2006.01) |

(52) U.S. Cl.
CPC .............. *F02C 7/264* (2013.01); *F02P 21/00* (2013.01); *F23Q 9/00* (2013.01); *F23R 3/36* (2013.01); *F02C 7/266* (2013.01); *F05D 2260/99* (2013.01)

(58) Field of Classification Search
CPC .............. F02C 7/264; F02P 21/00; F23R 3/36
See application file for complete search history.

(56) References Cited

U.S. PATENT DOCUMENTS

| 2,540,642 A | 2/1951 | Allen et al. |
| 2,541,900 A | 2/1951 | Williams |
| 2,645,082 A | 7/1953 | Sarto |
| 2,648,951 A | 8/1953 | McDougal |
| 2,734,341 A | 2/1956 | Lovesey |
| 2,784,553 A | 3/1957 | De et al. |
| 2,811,676 A | 10/1957 | Smits |
| 2,840,742 A | 6/1958 | Watters |
| 2,847,826 A | 8/1958 | Dennis |

(Continued)

FOREIGN PATENT DOCUMENTS

| DE | 1064760 B | 9/1959 |
| DE | 102018214281 B3 | 8/2019 |

(Continued)

OTHER PUBLICATIONS

Extended European Search Report for EP Application No. 21192156.4, dated Feb. 1, 2022, 7 pages.

(Continued)

*Primary Examiner* — Katheryn A Malatek
*Assistant Examiner* — Alyson Joan Harrington
(74) *Attorney, Agent, or Firm* — Kinney & Lange, P.A.

(57) ABSTRACT

A torch igniter system for a combustor of a gas turbine engine includes a housing defining a combustion chamber, an ignition source disposed at least partially in the combustion chamber, a fuel injector, a first fluid path connecting a first fuel source to the fuel injector, a second fluid path connecting an air source to the fuel injector, and a third fluid path connecting a second fuel source to the combustion chamber. The fuel injector is configured to inject fuel, air, or a mixture of fuel and air into the combustion chamber and to impinge on the ignition source.

10 Claims, 9 Drawing Sheets

(56) References Cited

U.S. PATENT DOCUMENTS

| | | | |
|---|---|---|---|
| 2,864,234 A | 12/1958 | Seglem et al. | |
| 2,885,859 A | 5/1959 | Barberis | |
| 2,958,196 A | 11/1960 | Wie et al. | |
| 2,967,224 A | 1/1961 | Irwin | |
| 3,009,321 A | 11/1961 | Jones et al. | |
| 3,487,636 A | 1/1970 | Scott et al. | |
| 3,558,251 A | 1/1971 | Bauger et al. | |
| 3,690,093 A * | 9/1972 | Carlisle | F23R 3/36 60/39.463 |
| 3,898,797 A | 8/1975 | Wood | |
| 3,954,389 A | 5/1976 | Szetela | |
| 3,990,834 A | 11/1976 | Dubell et al. | |
| 4,012,904 A | 3/1977 | Nogle | |
| 4,099,373 A | 7/1978 | Griffin et al. | |
| 4,112,675 A | 9/1978 | Pillsbury et al. | |
| 4,141,213 A | 2/1979 | Ross | |
| 4,194,358 A | 3/1980 | Stenger | |
| 4,351,156 A | 9/1982 | White et al. | |
| 4,412,414 A | 11/1983 | Novick et al. | |
| 4,828,488 A | 5/1989 | Reiser et al. | |
| 4,860,533 A | 8/1989 | Joshi | |
| 4,912,931 A | 4/1990 | Joshi et al. | |
| 4,915,615 A | 4/1990 | Kawamura et al. | |
| 5,085,040 A | 2/1992 | Tilston | |
| 5,390,855 A | 2/1995 | Mims et al. | |
| 5,469,700 A | 11/1995 | Corbett et al. | |
| 5,499,497 A | 3/1996 | Defreitas | |
| 5,636,511 A | 6/1997 | Pfefferle et al. | |
| 5,640,841 A | 6/1997 | Crosby | |
| 5,673,554 A | 10/1997 | Defreitas et al. | |
| 5,695,328 A | 12/1997 | Defreitas et al. | |
| 5,720,163 A | 2/1998 | Pfefferle et al. | |
| 5,744,206 A | 4/1998 | Russek et al. | |
| 5,845,480 A | 12/1998 | Defreitas et al. | |
| 6,138,654 A | 10/2000 | Pretorius et al. | |
| 6,195,247 B1 | 2/2001 | Cote et al. | |
| 6,240,731 B1 | 6/2001 | Hoke et al. | |
| 6,247,300 B1 | 6/2001 | Muramatsu et al. | |
| 6,483,022 B1 | 11/2002 | Packard | |
| 6,884,967 B1 | 4/2005 | Leigh | |
| 6,915,638 B2 | 7/2005 | Runkle et al. | |
| 6,952,927 B2 | 10/2005 | Howell et al. | |
| 6,968,699 B2 | 11/2005 | Howell et al. | |
| 7,124,724 B2 | 10/2006 | Fleetwood | |
| 7,137,255 B2 | 11/2006 | Schmotolocha et al. | |
| 7,216,488 B2 | 5/2007 | Howell et al. | |
| 7,470,875 B1 | 12/2008 | Wilcox et al. | |
| 7,481,248 B2 | 1/2009 | Prociw et al. | |
| 7,637,094 B2 | 12/2009 | Costello et al. | |
| 8,365,710 B2 | 2/2013 | Lykowski et al. | |
| 8,713,944 B2 | 5/2014 | Bleeker | |
| 9,080,772 B2 | 7/2015 | Prociw et al. | |
| 9,135,755 B2 | 9/2015 | Youssef | |
| 9,279,398 B2 | 3/2016 | McAlister | |
| 9,413,141 B2 | 8/2016 | Leglaye et al. | |
| 9,453,491 B2 | 9/2016 | Tanaka et al. | |
| 9,476,399 B1 | 10/2016 | Munson | |
| 9,567,912 B2 | 2/2017 | Prociw et al. | |
| 10,041,859 B2 | 8/2018 | Desilva et al. | |
| 10,156,189 B2 | 12/2018 | Sze et al. | |
| 10,488,047 B2 | 11/2019 | Ott et al. | |
| 10,584,639 B2 | 3/2020 | Dam et al. | |
| 10,711,699 B2 | 7/2020 | Dam et al. | |
| 10,823,398 B2 | 11/2020 | Choudhri et al. | |
| 11,209,164 B1 | 12/2021 | Ryon et al. | |
| 11,226,103 B1 | 1/2022 | Ryon et al. | |
| 11,255,535 B1 | 2/2022 | Eckert et al. | |
| 2002/0050061 A1 | 5/2002 | Komyoji et al. | |
| 2002/0162333 A1 | 11/2002 | Zelina | |
| 2004/0050061 A1 | 3/2004 | Schmotolocha et al. | |
| 2004/0168442 A1 | 9/2004 | Schmotolocha et al. | |
| 2005/0053876 A1 | 3/2005 | Joos et al. | |
| 2005/0166595 A1 | 8/2005 | Fletcher et al. | |
| 2005/0284442 A1 | 12/2005 | Stuttaford et al. | |
| 2006/0054233 A1 | 3/2006 | Prociw et al. | |
| 2006/0168967 A1 | 8/2006 | Simons et al. | |
| 2008/0141651 A1 | 6/2008 | Eason et al. | |
| 2008/0299504 A1 | 12/2008 | Horn | |
| 2009/0234555 A1 | 9/2009 | Williams et al. | |
| 2009/0314000 A1 | 12/2009 | Evulet et al. | |
| 2010/0043444 A1 | 2/2010 | Gross et al. | |
| 2010/0126617 A1 | 5/2010 | Stroempl et al. | |
| 2011/0088409 A1 | 4/2011 | Carlisle | |
| 2011/0271684 A1 | 11/2011 | Corsmeier et al. | |
| 2012/0085468 A1 | 4/2012 | Walker | |
| 2012/0125008 A1 | 5/2012 | Prociw et al. | |
| 2013/0000323 A1 | 1/2013 | Kupratis | |
| 2013/0040255 A1* | 2/2013 | Shi | C10J 3/503 431/354 |
| 2013/0143171 A1 | 6/2013 | Soda et al. | |
| 2013/0174562 A1 | 7/2013 | Holcomb et al. | |
| 2013/0283800 A1 | 10/2013 | Romig et al. | |
| 2014/0060063 A1 | 3/2014 | Boardman et al. | |
| 2014/0150401 A1 | 6/2014 | Venter | |
| 2014/0215997 A1 | 8/2014 | Lior et al. | |
| 2014/0216384 A1 | 8/2014 | Tanaka et al. | |
| 2014/0260304 A1 | 9/2014 | Cummings et al. | |
| 2014/0290259 A1 | 10/2014 | Plante et al. | |
| 2014/0314548 A1 | 10/2014 | Rivers et al. | |
| 2014/0366505 A1* | 12/2014 | Prociw | F02C 7/266 60/39.821 |
| 2014/0366542 A1 | 12/2014 | Teets | |
| 2014/0366551 A1 | 12/2014 | Prociw et al. | |
| 2015/0036781 A1 | 2/2015 | Youssef | |
| 2015/0040575 A1 | 2/2015 | Martinez Fabre et al. | |
| 2015/0260406 A1 | 9/2015 | Carrere | |
| 2015/0275755 A1 | 10/2015 | Ogata et al. | |
| 2015/0275769 A1 | 10/2015 | Foutch et al. | |
| 2015/0308351 A1 | 10/2015 | Sheridan | |
| 2015/0345426 A1 | 12/2015 | Houston et al. | |
| 2015/0345788 A1 | 12/2015 | Miyata et al. | |
| 2016/0003150 A1 | 1/2016 | Dicintio et al. | |
| 2016/0010559 A1 | 1/2016 | Hoke et al. | |
| 2016/0047318 A1 | 2/2016 | Dam et al. | |
| 2016/0084169 A1 | 3/2016 | Stuttaford et al. | |
| 2016/0169110 A1* | 6/2016 | Myers | F23D 17/002 60/776 |
| 2016/0230993 A1 | 8/2016 | Dai et al. | |
| 2017/0082022 A1 | 3/2017 | Lee | |
| 2017/0138266 A1 | 5/2017 | Caples | |
| 2017/0145852 A1 | 5/2017 | McCune et al. | |
| 2017/0284298 A1 | 10/2017 | Suciu et al. | |
| 2017/0298822 A1 | 10/2017 | Garde la Casa | |
| 2017/0350590 A1 | 12/2017 | Choudhri et al. | |
| 2017/0356656 A1 | 12/2017 | Ogata et al. | |
| 2018/0003388 A1 | 1/2018 | Park | |
| 2018/0010795 A1 | 1/2018 | Nath et al. | |
| 2018/0051710 A1 | 2/2018 | Takamura et al. | |
| 2018/0058224 A1 | 3/2018 | Jennings et al. | |
| 2018/0058331 A1 | 3/2018 | Barton et al. | |
| 2018/0058404 A1 | 3/2018 | Tibbs | |
| 2018/0100437 A1 | 4/2018 | Dicintio et al. | |
| 2018/0134407 A1 | 5/2018 | Elbibary et al. | |
| 2018/0154446 A1 | 6/2018 | Brown et al. | |
| 2018/0170575 A1 | 6/2018 | Ziarno | |
| 2018/0172271 A1 | 6/2018 | Moniz et al. | |
| 2018/0179896 A1 | 6/2018 | Pal et al. | |
| 2018/0179956 A1 | 6/2018 | Wertz | |
| 2018/0283692 A1 | 10/2018 | Ryon et al. | |
| 2018/0356095 A1 | 12/2018 | Patel et al. | |
| 2018/0363555 A1 | 12/2018 | Zelina et al. | |
| 2019/0010872 A1 | 1/2019 | Dam et al. | |
| 2019/0024897 A1 | 1/2019 | Prociw et al. | |
| 2019/0032561 A1 | 1/2019 | Stoia et al. | |
| 2019/0178497 A1 | 6/2019 | Jones et al. | |
| 2019/0249077 A1 | 8/2019 | Fryer | |
| 2020/0080530 A1 | 3/2020 | Freer et al. | |
| 2020/0088409 A1 | 3/2020 | Greenfield et al. | |
| 2020/0191059 A1 | 6/2020 | Ryon et al. | |
| 2020/0309378 A1 | 10/2020 | Dam et al. | |
| 2020/0348024 A1 | 11/2020 | Hicks | |
| 2021/0215100 A1 | 7/2021 | Head et al. | |
| 2022/0007488 A1 | 1/2022 | Bai et al. | |

(56) References Cited

U.S. PATENT DOCUMENTS

FOREIGN PATENT DOCUMENTS

| EP | 2189720 A1 | 5/2010 |
| EP | 3128166 A1 | 2/2017 |
| EP | 2677240 B1 | 4/2020 |
| FR | 970988 A | 1/1951 |
| FR | 1218296 A | 5/1960 |
| GB | 693846 A | 7/1953 |
| GB | 791990 A | 3/1958 |
| GB | 819141 A | 8/1959 |
| GB | 859184 A | 1/1961 |
| JP | 2015021715 A | 2/2015 |
| KR | 101279722 B1 | 6/2013 |

OTHER PUBLICATIONS

"Metal Seal Design Guide—High Performance Engineered Seals and Sealing Systems", from Parker Hannifin Corporation Composite Sealing Systems Division, 2016, 106 pages.
Database WPI—2017 Clarivate Analytics, Week 201919, Thomson Scientific, London GB; an 2019-17673X XP002806356, 2 pages.
Extended European Search Report for EP Application No. 21215655.8, dated May 2, 2022, 8 pages.
Extended European Search Report for EP Application No. 21215709.3, dated May 12, 2022, 9 pages.
Extended European Search Report for EP Application No. 21201782.6, dated Mar. 28, 2022, 10 pages.
Extended European Search Report for EP Application No. 21205035.5, dated Mar. 28, 2022, 9 pages.
Extended European Search Report for EP Application No. 21214138.6, dated Apr. 25, 2022, 7 pages.
Extended European Search Report for EP Application No. 21212869.8, dated Apr. 28, 2022, pp. 7.
Extended European Search Report for EP Application No. 21213899.4, dated May 6, 2022, 8 pages.
Extended European Search Report for EP Application No. 21214511 4, dated Apr. 29, 2022, 8 pages.
Extended European Search Report for EP Application No. 21214798.7, dated May 11, 2022, 8 pages.
Extended European Search Report for EP Application No. 21214894.4, dated May 3, 2022, 9 pages.
Extended European Search Report for EP Application No. 21205393.8, dated Mar. 17, 2022, 8 pages.
Extended European Search Report for EP Application No. 21214883.7, dated May 13, 2022, pp. 10.
Extended European Search Report for EP Application No. 21209057.5, dated Jul. 19, 2022, 8 pages.
Extended European Search Report for EP Application No. 21216163.2, dated May 16, 2022, 8 pages.

* cited by examiner

FUEL SYSTEMS FOR TORCH IGNITION DEVICES

BACKGROUND

The present disclosure relates to gas turbine engines and, more particularly, to fuel systems for torch igniters used in the combustion section of a gas turbine engine.

Gas turbine engines are used in industrial settings to generate electrical power. These gas turbine engines can be configured to accept multiple types of fuels to decrease operational costs and to mitigate the impact of unplanned fuel outages on power generation. Gaseous hydrocarbons, such as natural gas, are often used as a primary fuel source due to their ease of combustion. However, these gas turbine engines are also often capable of accepting liquid fuels, such as conventional diesel fuel.

Torch igniters can be used in lieu of spark igniters to provide an ignition source for combustors located in gas turbine engines. Torch igniters provide a flame as an ignition source for a combustor rather than the electric current provided by spark igniters. Consequently, torch igniters can provide a larger target for fuel injectors used in a combustor, permitting the use of a greater range of fuel injector designs. However, unlike spark igniters, torch igniters usually require a fuel source, such as a liquid or gaseous hydrocarbon fuel, to create a flame suitable for igniting fuel in a main combustor.

SUMMARY

The present disclosure provides an embodiment of a torch igniter system for a combustor of a gas turbine engine that includes a housing defining a combustion chamber, an ignition source disposed at least partially in the combustion chamber, a fuel injector, a first fluid path connecting a first fuel source to the fuel injector, a second fluid path connecting an air source to the fuel injector, and a third fluid path connecting a second fuel source to the combustion chamber. The fuel injector is configured to inject fuel, air, or a mixture of fuel and air into the combustion chamber and to impinge on the ignition source.

The present disclosure additionally provides a torch igniter for a combustor of a gas turbine engine that includes a housing defining a combustion chamber, an ignition source disposed at least partially in the combustion chamber, a fuel injector configured to inject a first fluid into the combustion chamber to impinge on the ignition source, a first fluid channel connected to the fuel injector, an aperture extending at least partially through the housing, and configured to inject a second fluid into the combustion chamber to impinge on the ignition source.

The present disclosure further provides a method of switching fuels delivered to a torch igniter in a combustion section of a gas turbine engine that includes delivering a first fuel to a combustion chamber along a first flow path, creating a flame within the combustion chamber by impinging the fuel on an ignition source, detecting an interruption in the delivery of the first fuel, delivering a second fuel to the combustion chamber along a second flow path after detecting the interruption, and igniting the second fuel with the flame in the combustion chamber. The combustion chamber is defined by a housing.

Figure 1:
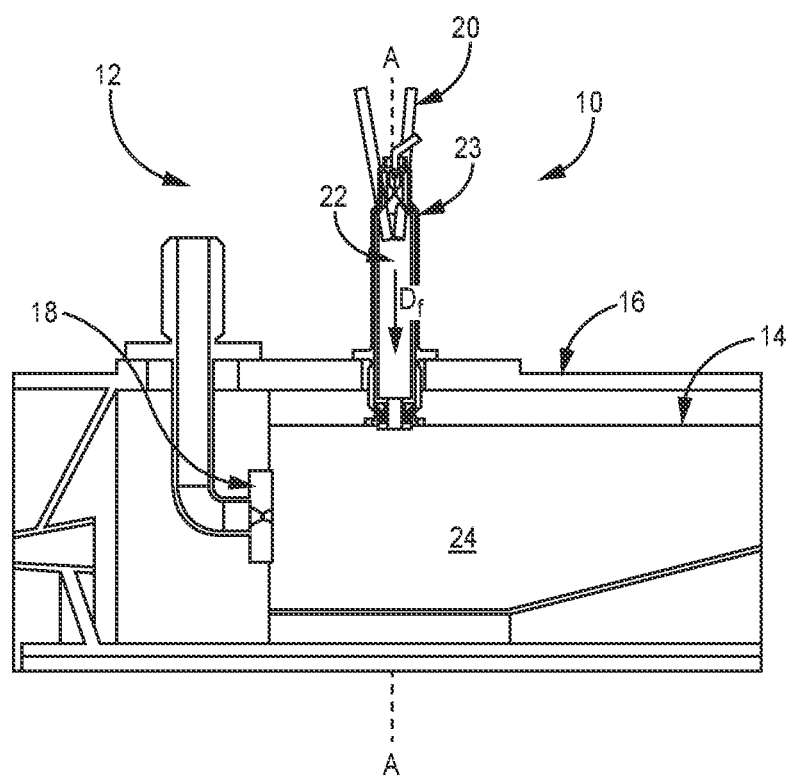
FIG. 1 is a cross-sectional view of an example of a torch igniter in a combustion section of a gas turbine engine.

While the above-identified figures set forth one or more embodiments of the present disclosure, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features and components not specifically shown in the drawings.

DETAILED DESCRIPTION

The present disclosure presents systems and methods for improving fuel flexibility of torch igniter systems used in the combustion section of a gas turbine engine. By improving torch igniter fuel flexibility, these systems and methods allow torch igniter systems to use the same variety of fuels as the main combustor of a gas turbine power generator, reducing operational costs associated with the torch igniter system as well as the overall complexity required to implement torch igniter systems in gas turbine power generators. Further, the systems and methods disclosed herein advantageously allow for torch igniter systems to rapidly switch fuel sources while continuously operating. As such, these systems and methods are capable of responding to unplanned fuel outages without interrupting the operation of a torch igniter system.

FIG. 1 is a cross-sectional view of torch igniter 10 disposed within combustion section 12 of a gas turbine engine. In the illustrated embodiment, torch igniter 10 is mounted to combustor liner 14 and extends along axis A-A through high-pressure case 16 such that it is oriented generally orthogonally to the direction of a fuel spray from fuel nozzle 18. In operation, a fuel impinges on surface igniter 20 and creates combustion gases within torch combustion chamber 22. Housing 23 surrounds and defines combustion chamber 22. Housing 23 is made of any suitable material to contain high-temperature combustion gases and in some examples is made of a metal material readily fabricable by additive manufacturing. Alternatively, housing 23 can be fabricated by subtractive manufacturing or a combination of additive and subtractive manufacturing. Combustion gases travel through torch combustion chamber 22 in direction $D_f$ and enter an interior volume of combustor 24. Combustion gases entering combustor 24 are capable of igniting the fuel mixture from fuel nozzle 18 and thereby initiating combustion within combustor 24. Torch igniter 10 intakes air to be used for combustion within torch combustion chamber 22 from within high-pressure case 16 or from elsewhere in the gas turbine engine.

In the example depicted in FIG. 1, surface igniters 20 are rod-shaped glow plugs mounted through housing 23. In examples where surface igniters 20 are glow plugs, they are resistively heated to ignite fuel in combustion chamber 22. Where surface igniters 20 are glow plugs, they can be resistively heated by electric current supplied by a power source and are formed of a material capable of being non-destructively resistively heated. The material can be a ceramic material, such as silicon nitride. It should be understood, however, that surface igniters 20 can be any type of igniter suitable for igniting fuel in torch combustion chamber 22, and in some examples can be spark igniters.

Advantageously, torch igniter 10 can operate continuously during the entire operation time of the gas turbine engine in which it is located. Continuous operation allows torch igniter 10 to easily facilitate altitude re-lights of combustor 24 by acting as a pilot light for fuel ignition within combustor 24. Further, torch igniter 10 can operate continuously with a self-sustaining flame. The self-sustaining flame can be maintained without requiring operation of surface igniters 20 by adding additional fuel to combustion chamber 22. Combustion gases already present in combustion chamber 22 ignite added fuel to create the self-sustaining flame.

Figure 2:
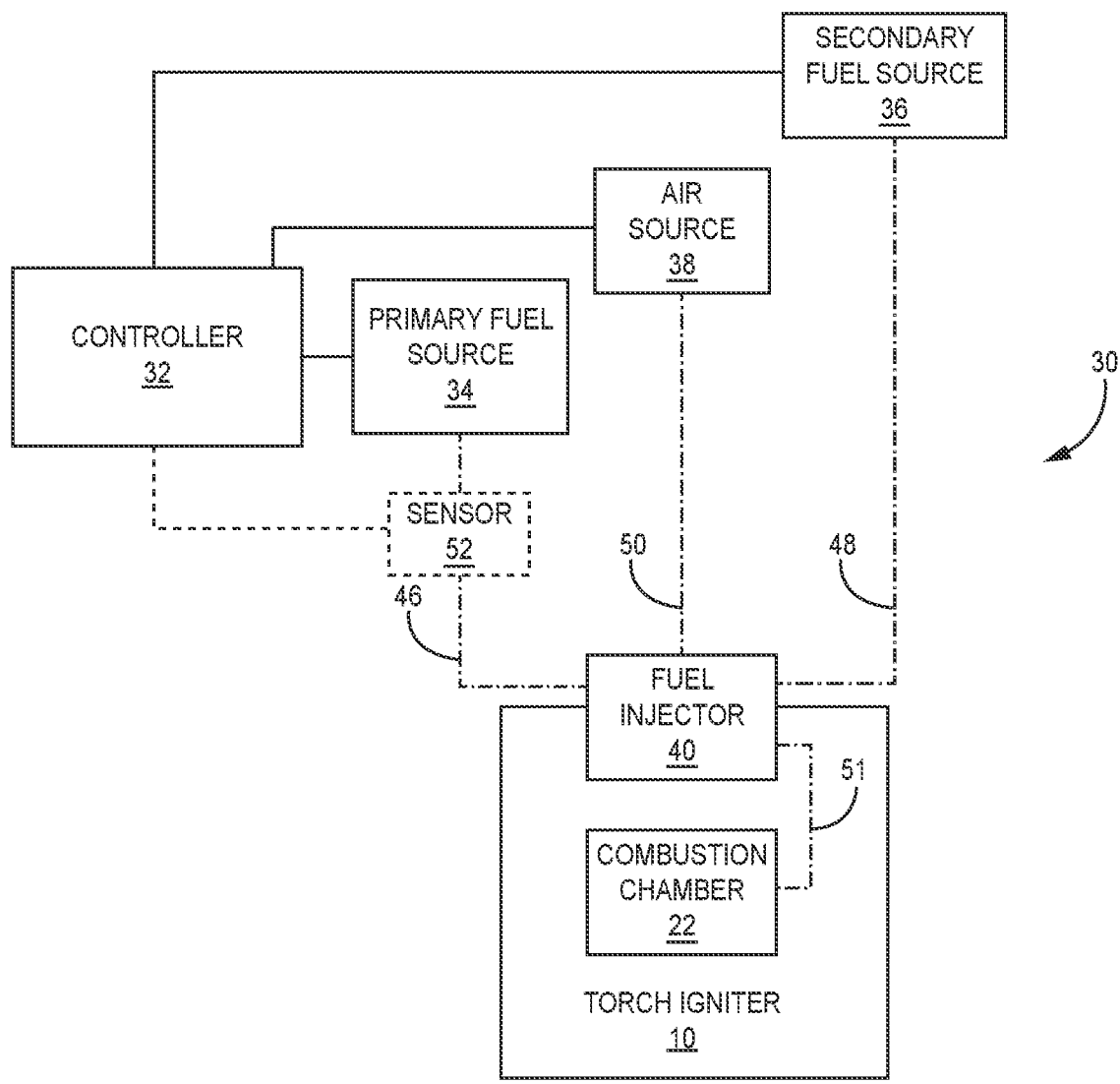
FIG. 2 is a schematic diagram of an example of a fuel system that can be used with the torch igniter of FIG. 1.

FIG. 2 is a schematic diagram of fuel system 30, which can be used to control fuel delivery to torch igniter 10. Fuel system 30 includes controller 32, primary fuel source 34, secondary fuel source 36, air source 38, and fuel injector 40. Fuel injector 40 is configured to inject gaseous fuel, liquid fuel, and air into torch combustion chamber 22 to generate combustion gases useful for igniting fuel in main combustor 24. Primary fuel source 34 is configured to deliver a primary fuel to fuel injector 40 along fluid path 46, secondary fuel source 36 is configured to deliver a secondary fuel to fuel injector 40 along fluid path 48, and air source 38 is configured to deliver air to fuel injector 40 along fluid path 50. Generally, both primary fuel source 34 and secondary fuel source 36 can be configured to deliver a gaseous fuel or a liquid fuel. In some examples, both primary fuel source 34 and secondary fuel source 36 may supply gaseous fuels or both primary fuel source 34 and 36 may supply liquid fuels. In other examples, one of either primary fuel source 34 and secondary fuel source 36 supplies a gaseous fuel and the other fuel source supplies a liquid fuel. The gaseous fuel can, for example, be selected from natural gas, hydrogen, ammonia, liquid hydrogen, syngas, or a blend of any of those fuels. The liquid fuel can, for example, be conventional diesel, biodiesel, kerosene, naphtha, or a blend of any of those fuels. The air delivered by air source 38 is generally a compressed air and is used by fuel injector 40 to atomize liquid fuel from primary fuel source 34 or secondary fuel source 36 and thereby form an air/liquid fuel mixture. Air delivered by air source 38 can also be delivered directly to combustion chamber 22 for use in combustion within combustion chamber 22. In some examples, fuel injector 40 is configured to channel a portion of air from air source 38 to combustion chamber 22 along fluid path 51 for use in combustion. In other examples, high-pressure air is delivered to combustion chamber 22 from another air source, such as from air inside of high-pressure case 18 of combustion section 12.

Controller 32 is an electronic controller, such as an engine control unit (ECU) of a full authority digital engine control (FADEC) or another appropriate gas turbine controller, such as a power generation engine control system. Generally, controller 32 is configured to supply torch igniter 10 with a primary fuel from primary fuel source 34 and to reserve secondary fuel source 36 as a backup fuel supply. However, controller 32 can also be configured to supply torch igniter 10 with ratios or gradients of primary and secondary fuel, as described in greater detail subsequently. Controller 32 can control the rate of fuel delivery from primary fuel source 34 by, for example, operating a valve disposed along fluid path 46 or a pump capable of pumping fuel from primary fuel source 34. Controller 32 can control the rate of fuel delivery from secondary fuel source 36 by, for example, operating a valve along fluid path 48 or a pump capable of pumping fuel from secondary fuel source 36. Likewise, controller 32 can control the rate of delivery of air from air source 38 by, for example, operating a valve disposed along fluid path 50. Notably, controller 32 is configured to control the delivery of fuel to fuel injector 40 by controlling the flow along fluid paths 46, 48, and 50, rather than by direct connection to fuel injector 40. Advantageously, this allows system 30 to employ a variety of designs for fuel injector 40, including designs where fuel injector 40 is more than one discrete component within torch igniter 10 or designs where two or more of fluid paths 46, 48 and 50 overlap within fuel injector 40.

Controller 32 can also include a user interface capable of allowing an operator to select the type of fuel supplied to torch igniter 10. Alternatively, when primary fuel source 34 is depleted or the gaseous fuel supply to fuel injector 40 is otherwise interrupted, controller 32 can be configured to automatically switch the fuel supply for fuel injector 40 from the primary fuel to the secondary fuel. The amount of air supplied to fuel injector 40 from air source 38 can be determined by controller 32 automatically or selected by an operator via, for example, a user interface. In examples where the primary fuel or secondary fuel is a liquid fuel, controller 32 can be configured to automatically supply air from air source 38 to atomize liquid fuel injected by injector 40. Alternatively, controller 32 can be configured to allow an operator to select the amount of air supplied to injector 40 for atomizing liquid fuel via, for example, a user interface. Further, in embodiments where one of either primary fuel source 34 and secondary fuel source 36 supplies a liquid fuel and the other fuel source supplies a gaseous fuel, controller 32 can use the gaseous fuel to purge the liquid fuel circuit and prevent formation of unwanted liquid fuel degradation products within the liquid fuel circuit.

Advantageously, controller 32 can be configured to rapidly switch between fuel sources, allowing torch igniter 10 to continuously operate with a self-sustaining flame after planned or unplanned interruptions of fuel supply from primary fuel source 34. To facilitate fast switching from primary fuel source 34, system 30 can optionally include sensor 52, which is connected to controller 32 and disposed along fluid path 46. Controller 32 can use sensor 52 to monitor the flow of primary fuel to fuel injector 40 and detect when the flow of primary fuel is interrupted or otherwise falls below a pre-determined threshold, allowing torch igniter 10 to remain continuously lit with a self-sustaining flame while controller 32 switches fuel injected by fuel injector 40 from the primary fuel supplied by primary fuel source 34 to the secondary fuel supplied by secondary fuel source 36. Alternatively, sensor 52 can be integrated into primary fuel source 34 rather than disposed along fluid path 46.

Controller 32 can also be configured to deliver a mixture of fuels from primary fuel source 34 and secondary fuel source 36 to fuel injector 40. Controller 32 can be configured to taper the transition of fuel from primary fuel source 34 to secondary fuel source 36 as, for example, a gradient. Likewise, controller 32 can be configured to deliver fuels from primary fuel source 34 and secondary fuel source 36 simultaneously in a controlled ratio. For example, it can be advantageous to deliver multiple gaseous fuels, such as ammonia and hydrogen, to fuel injector 40 in a controlled ratio.

In some examples, controller 32 also controls fuel delivery to a main combustor, such as main combustor 24 shown in FIG. 1. In these examples, primary fuel source 34 or secondary fuel source 36 is used to supply fuel to combustor 24. Controller 32 can control fuel supplied by fluid paths 46 and 48 independently of the fuel supplied to main combustor 24, or system 30 can include one or more manifolds that passively divert a portion of fuel for combustor 24 to torch igniter 10, such that the rates of primary and secondary fuels flowing to torch igniter 10 are linked to the rates of primary and secondary fuels flowing to combustor 24. In these examples, controller 32 is generally configured to control the flow of air from air source 38 independently to control, for example, air supplied to combustion chamber 16 for combustion or for proper atomization of a liquid fuel supplied by primary fuel source 34 or secondary fuel source 36.

Control system 30 can, in some examples, contain additional fuel sources. For example, control system 30 can contain additional fuel sources configured to supply gaseous and/or liquid fuels. These examples can contain additional fluid paths to connect the additional fuel sources to injector 40 or can deliver the additional fuels via fluid paths 46, 48, or 50. Advantageously, these configurations allow torch igniter 10 to use a wider range of gaseous or liquid fuels. Where control system 30 contains additional fuel sources, controller 32 is generally configured to selectively flow the additional fuels via one or more valves or pumps, as described previously with respect to primary fuel source 34, secondary fuel source 36, and air source 38. Operation of torch igniter 10 as governed by controller 32 is described further hereinafter with reference to FIG. 9 and method 700.

FIGS. 3-8 depict various configurations of fuel injection systems that can be substituted for fuel injector 40 in fuel system 30. Generally, the fuel injectors depicted in FIGS. 3-8 are designed for use in embodiments of fuel system 30 where primary fuel source 34 is configured to supply a gaseous fuel and secondary fuel source 36 is configured to supply a liquid fuel, or in embodiments where primary fuel source 34 is configured to supply a liquid fuel and secondary fuel source 36 is configured to supply a gaseous fuel.

Figure 3:
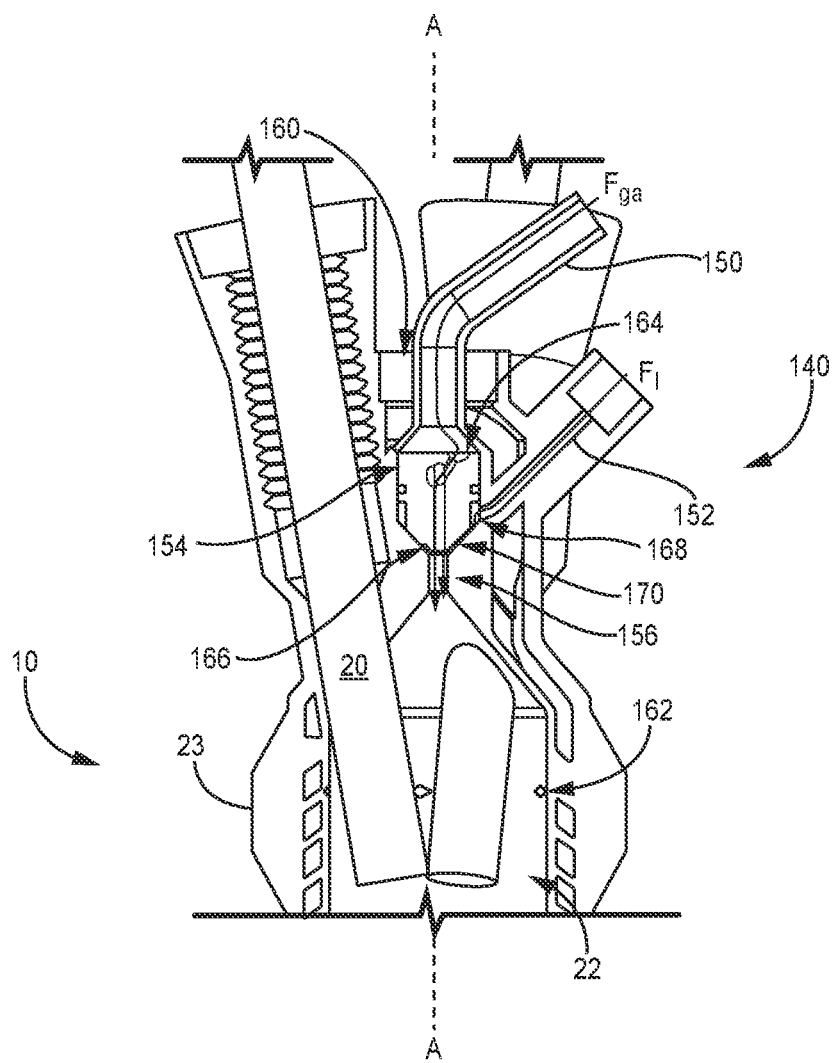
FIG. 3 is a cross-sectional view of an example of a fuel system for the torch igniter of FIG. 1 or 2.

FIG. 3 is a cross-sectional view of fuel injector 140, which can be used with torch igniter 10 and fuel system 30. Fuel injector 140 is configured to cause either a gaseous fuel or an air/liquid fuel mixture to impinge on surface igniters 20. Fuel injector 140 includes gas channel 150, liquid channel 152, flow divider 154, and injector aperture 156. Also depicted in FIG. 3 are air inlet 160 and air holes 162 of torch igniter 10. Air inlet 160 intakes air from a source of compressed air, such as the air within high-pressure case 18 or another fluid path connected to air source 38, and flows it through air holes 162 for use in combustion within, for example, combustion chamber 22.

The flow path of gases, including gaseous fuel and compressed air, overlap through fuel injector 140. For simplicity, these overlapping fuel paths are represented as a single flow path $F_{ga}$. Gaseous fuel flowing along flow path $F_{ga}$ ultimately enters combustion chamber 22 and impinges on surface igniters 20, igniting gaseous fuel and creating combustion gases useful for igniting fuel in main combustor 24. The flow path of liquid fuel through fuel injector 140 is shown by flow path $F_l$. Liquid fuel flowing along flow path $F_l$ is atomized by compressed air flowing along flow path $F_{ga}$, creating an air/liquid fuel mixture that impinges on surface igniters 20, thereby igniting and creating combustion gases in combustion chamber 22. Flow divider 154 functions to separate gaseous and liquid fluid flows upstream of injector aperture 156 and is disposed within an internal volume of fuel injector 140.

Gases enter fuel injector 140 via gas channel 150, which extends through a central portion of air inlet 160. Gas channel 150 extends substantially outside of housing 23, and is configured to channel a combustible gas fuel, such as a gaseous fuel from primary fuel source 34 or secondary fuel source 36, or compressed air, such as air from air source 38. Generally, gas channel 150 only receives one of either a gaseous fuel or air at any time. However, in some examples, gas channel 150 can receive a pre-mixed combination of gaseous fuel and air. Gas swirling channel 164 receives gases from gas channel 150 and extends through a central portion of flow divider 164 toward injector aperture 156. Swirling channel 164 is generally configured to cause gases flowing along flow path $F_{ga}$ to take a swirling path relative to axis A-A through combustion chamber 22, improving the uniformity of distribution of gaseous fuel and atomized liquid fuel across surface igniters 20. Gases exiting swirling channel 164 travel through mixing annulus 166, which will be described in detail below, and enter combustion chamber 22 through injector aperture 156. Injector aperture 156 extends through housing 23 and has a cylindrical shape centered on axis A-A, though it should be understood that injector aperture 156 can take any suitable shape for channeling a gaseous fuel or an air/liquid fuel mixture into combustion chamber 22. Similarly, while swirling channel 164 is shown in FIG. 3 as a single continuous channel, in some examples, swirling channel 164 forms three separate, converging channels within flow divider 154.

Generally, the pressure of gaseous fuel exiting a gaseous fuel source is not adjusted or reduced before the gaseous fuel enters gas channel 150 and swirling channel 164 thereafter. Consequently, gas channel 150 and swirling channel 164 must be sized to accommodate the appropriate flow rate of gas into torch igniter 10 based on the pressure of the gaseous fuel. In particular, the diameter of swirling channel 164 can be increased relative to embodiments shown in FIGS. 4 and 5 to ensure that gaseous fuel flows through swirling channel 164 at a flow rate sufficient for continuous operation of torch igniter 10. Further, because gaseous fuel and air have overlapping flow paths within fuel injector 140, there can be a risk of backward flow of gas toward the air source supplying air. To mitigate this, there can be a check valve placed along the air flow path at a position upstream of where the air and gaseous fuel flow paths overlap.

The flow of liquid fuel is shown by liquid flow path Fi. Liquid fuels, such as a liquid fuel supplied by primary fuel source 34 or secondary fuel source 36, enter fuel injector 140 through liquid channel 152 and flow toward injector aperture 156. Liquid fuel flows from liquid channel 152 through annular channel 168, which extends between flow divider 154 and an interior wall of fuel injector 140. Liquid fuel flows from annular channel 168 to mixing annulus 166 through channels 170, which meter the flow of liquid fuel to mixing annulus 166, improving atomization of liquid fuel by air exiting swirling channel 164. Channels 170 are formed between flow divider 154 and the interior wall of fuel injector 140. In mixing annulus 166, liquid fuel is atomized by compressed air flowing along flow path $F_{ga}$, creating an air/liquid fuel mixture that can be injected into combustion chamber 22 as a spray. Atomized liquid fuel is injected through injector aperture 156 and impinges on surface igniter 20.

Figure 4:
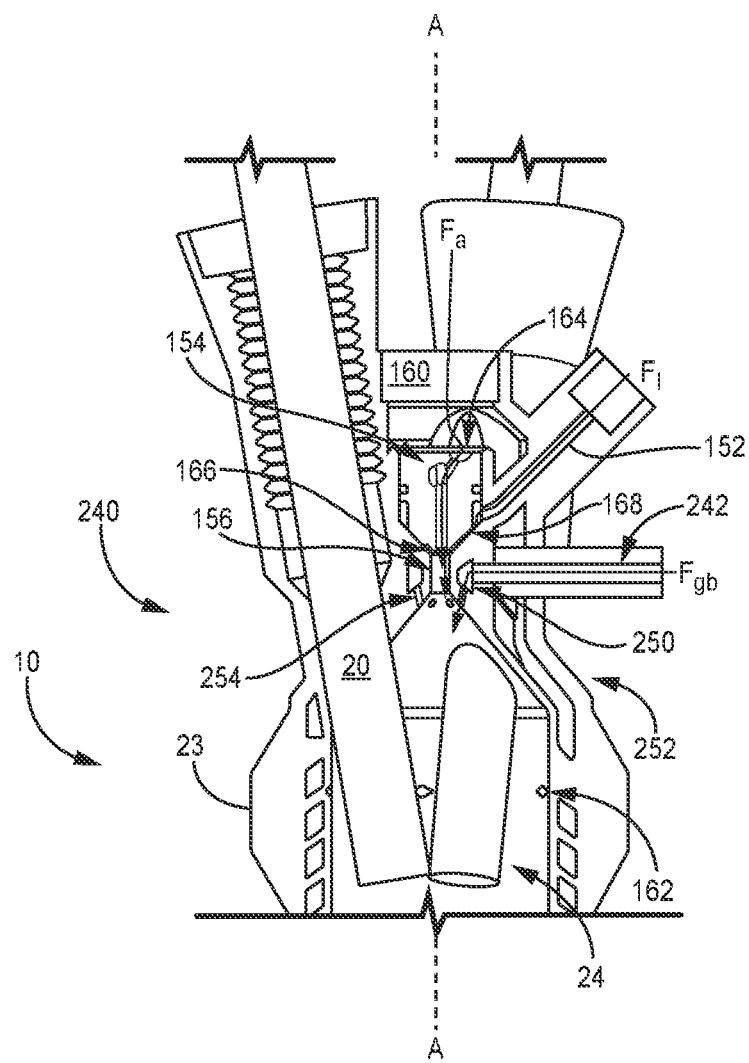
FIG. 4 is a cross-sectional view of an alternative example of a fuel system for the torch igniter of FIG. 1 or 2.

FIG. 4 is a cross-sectional view of fuel injector 240, which is substantially similar to fuel injector 140, except for the addition of gaseous fuel flow path $F_{gb}$. Rather than using a shared, overlapping flow path within torch igniter 10, air for atomizing liquid fuel flows along a flow path $F_a$ and gaseous fuel flows along flow path $F_{gb}$, which are separate and non-overlapping. Liquid fuel flow path $F_l$ in fuel injector 240 is substantially the same as in fuel injector 140 and air flow path $F_a$ is substantially the same as gas flow path $F_{ga}$.

The flow of gaseous fuel is indicated by flow path $F_{gb}$. Gaseous fuel, such as a gaseous fuel from primary fuel source 34 or secondary fuel source 36, enters fuel injector 240 through gas fuel channel 242, which extends transverse to axis A-A through an outer wall of housing 23. Fuel channel 242 channels gaseous fuel into swirling annulus 250, which is centered on axis A-A and imparts gaseous fuel with a swirl relative to axis A-A as it enters combustion chamber 22, improving distribution of fuel throughout combustion chamber 22, as described previously with respect to swirling channel 164. Swirling annulus 250 surrounds injector aperture 156 and is disposed in cap region 252 of torch igniter 10. Gaseous fuel exits swirling annulus 250 through cap apertures 254, which extend through an inner wall of housing 23, and impinges on surface igniters 20, thereby creating combustion gases within combustion chamber 22.

In FIG. 4, torch igniter 10 lacks gas channel 150 and uses a single air source, such as air source 38, both to flow air into combustion chamber 22 through air holes 162 and to atomize liquid fuel at mixing annulus 166. As illustrated by flow path $F_a$, a portion of air taken in at air inlet 160 is diverted through swirling channel 164 for use in atomizing liquid fuel. Consequently, the rates of air flowing through swirling channel 164 and air holes 162 are linked and cannot be independently adjusted by controller 32 when fuel injector is implemented in system 30.

Figure 5:
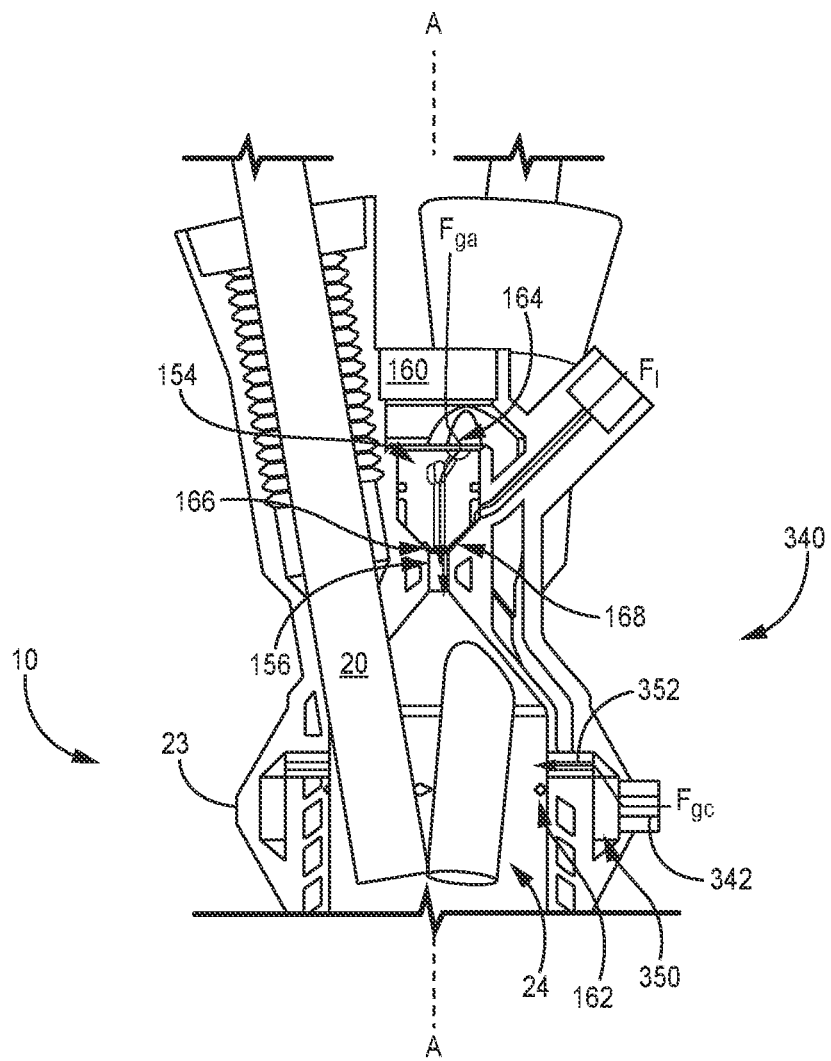
FIG. 5 is a cross-sectional view of an alternative example of a fuel system for the torch igniter of FIG. 1 or 2.

FIG. 5 is a cross-sectional view of fuel injector 340, which is substantially similar to fuel injectors 240, except for fuel flow path $F_{gc}$. Fuel injector 340 flows gaseous fuel according to flow path $F_{gc}$, which extends generally transverse to axis A-A. Specifically, gas enters fuel injector 340 through fuel channel 342, which extends transverse to axis A-A through an outer wall of housing 23. Fuel channel 342 channels gaseous fuel to swirling annulus 350, which is centered on axis A-A and imparts gaseous fuel with a swirl relative to axis A-A as it enters combustion chamber 22, improving distribution of fuel throughout combustion chamber 22 as described previously with respect to swirling channel 164 and swirling annulus 250. Gaseous fuel enters combustion chamber 22 through fuel apertures 352, which extend transverse to the axis and are disposed near air holes 162. Fuel apertures 352 flow gaseous fuel to impinge on surface igniters 20, creating combustion gases within combustion chamber 22.

Figure 6:
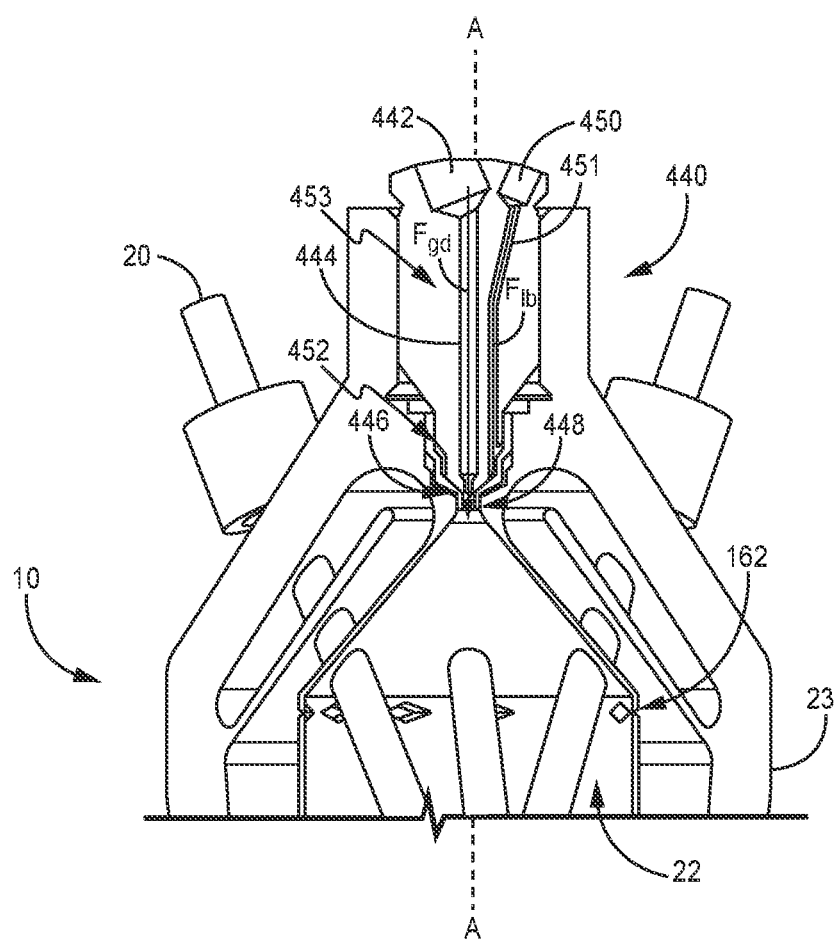
FIG. 6 is a cross-sectional view of an alternative example of a fuel system for the torch igniter of FIG. 1 or 2.

FIG. 6 is a cross-sectional view of fuel injector 440, which can be used with torch igniter 10 and fuel system 30. Fuel injector 440 includes gas inlet 442, gas channel 444, mixing annulus 446, injector aperture 448, liquid fuel inlet 450, fuel channel 451, annular channel 452 and injector body 453. Air holes 162 are also depicted in FIG. 6, though air inlet 160 is disposed in a different location than in configurations of torch igniter 10 having fuel injector systems 140, 240, or 340 and is not shown.

Like fuel injector 140, gaseous fuel and air for atomizing liquid fuel flow along substantially co-spatial flow paths within fuel injector 440. These overlapping flow paths are represented as a single flow path $F_{gd}$ for simplicity. Both air and gaseous fuel enter fuel injector 440 at gas inlet 442. Gas inlet 442 functions to intake a flow of gas from a gaseous fuel source or a flow of air from an air source, such as air source 38. Generally, only one of a flow of gaseous fuel or a flow of air is taken in through gas inlet 442 at any time. Gas taken in at gas inlet 442 is channeled along gas channel 444, which is generally cylindrical and extends along axis A-A through injector body 453. Gas channel 444 connects to mixing annulus 446, which functions to mix air and liquid fuel, atomizing the liquid fuel and forming an air/liquid fuel mixture. When gaseous fuel is flowing along flow path $F_{gd}$, no mixing of gaseous fuel occurs in mixing annulus 446. Both gaseous fuels and air/liquid fuel mixtures exit fuel injector 440 through injector aperture 448, which is generally cylindrical and extends along axis A-A through housing 23. Gaseous fuel and atomized liquid fuel exiting injector aperture 448 enter combustion chamber 22 and impinge on a surface of surface igniter 20, creating combustion gases within combustion chamber 22.

As described previously with respect to fuel injector 140, the pressure of gaseous fuel exiting a gaseous fuel source is generally not adjusted or reduced before the gaseous fuel enters gas inlet 442 and gas channel 444 thereafter. Consequently, gas inlet 442 and gas channel 444 must be sized to accommodate the appropriate flow rate of gas into torch igniter 10 based on the pressure of the gaseous fuel. In particular, the diameter of gas inlet 442 and gas channel 444 can be increased relative to embodiments shown in FIGS. 7 and 8 to ensure that gaseous fuel flows through gas inlet 442 and gas channel 444 at a flow rate sufficient for continuous operation of torch igniter 10. Further, because gaseous fuel and air have overlapping flow paths within fuel injector 440, there can be a risk of backward flow of gas toward the air source supplying air. To mitigate this, there can be a check valve placed along the air flow path at a position upstream of where the air and gaseous fuel flow paths overlap.

The flow of liquid fuel through fuel injector 440 is represented by flow path $F_{lb}$. Liquid fuel enters fuel injector 440 at liquid fuel inlet 450. Liquid fuel is channeled to annular channel 452 from inlet 450 by a channel (not shown) extending through injector body 453 that is fluidly separated from gas channel 444. Annular channel 452 extends between gas channel 444 and an inner wall of fuel injector 440 along axis A-A. The portion of annular channel 452 adjacent to mixing annulus 446 can be configured to meter the flow of liquid fuel, as described previously with respect to channels 170. Liquid fuel flows through annular channel 452 to mixing annulus 446 and air flowing through gas channel 444 mixes with the liquid fuel in mixing annulus 446. Mixing liquid fuel with air from gas channel 444 atomizes the liquid fuel, allowing liquid fuel to be injected into combustion chamber 22 as a spray.

As depicted in FIG. 6, gas channel 444, mixing annulus 446, injector aperture 448, and annular channel 452 are centered on axis A-A. It should be understood, however, that gas channel 444, mixing annulus 446, injector aperture 448, and annular channel 452 can be in any suitable arrangement for channeling fuels into combustion chamber 22.

Figure 7:
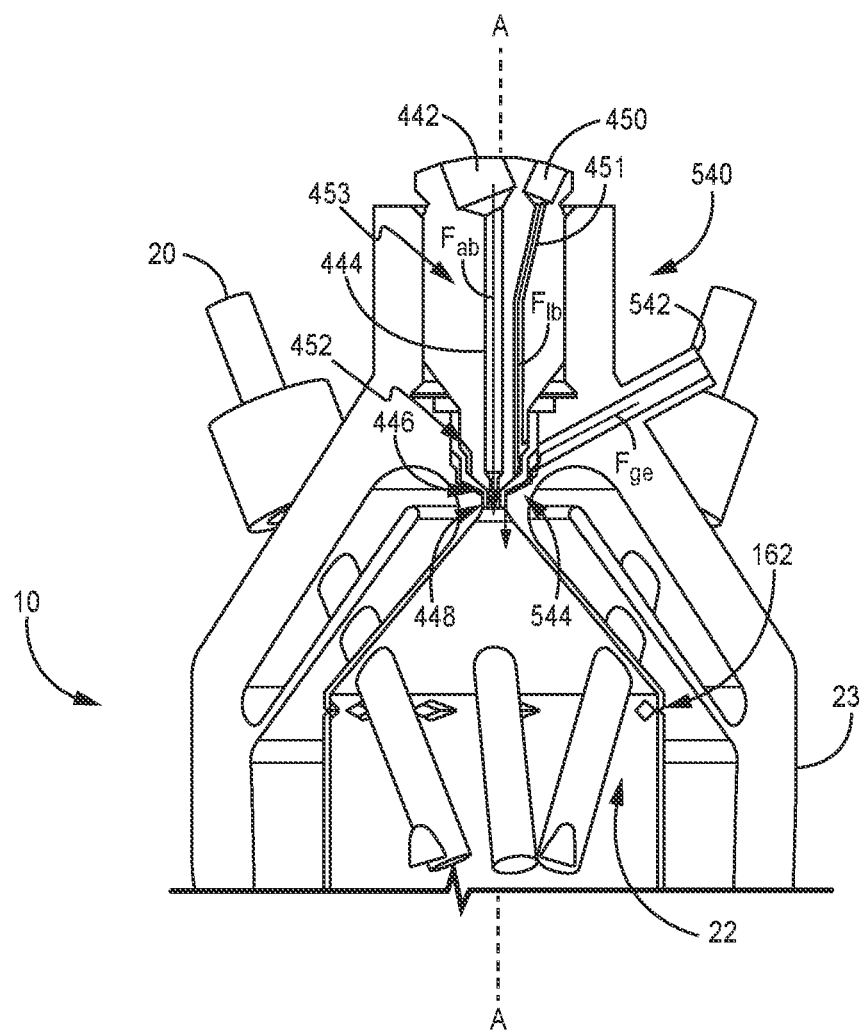
FIG. 7 is a cross-sectional view of an alternative example of a fuel system for the torch igniter of FIG. 1 or 2.

FIG. 7 is a cross-sectional view of fuel injector 540, which is arranged substantially similarly to fuel injector 440, except for the addition of fuel flow path $F_{ge}$. Unlike fuel injector 440, fuel injector 540 does not use a shared, overlapping flow path for air and gaseous fuel. Rather, air for atomizing liquid fuel flows according to flow path $F_{ab}$, and gaseous fuel flows through separate flow path $F_{ge}$. Liquid fuel flow path Fi in fuel injector 540 is substantially the same as in fuel injector 440 and air flow path $F_{ab}$ is substantially the same as gas flow path $F_{gd}$.

Gaseous fuel, such as a gas from primary fuel source 34 or secondary fuel source 36, flows along flow path $F_{ge}$ through channel 542, which extends through housing 23. Gaseous fuel enters fuel injector 440 through channel 542 and flows to annular channel 544. Annular channel 544 extends along axis A-A, and is fluidly separated from and surrounds mixing annulus 446 and injector aperture 448. Annular channel 544 flows gaseous fuel into combustion chamber 22 and causes gaseous fuel to impinge on surface igniters 20, igniting the gaseous fuel and creating combustion gases within combustion chamber 22.

Unlike fuel injectors 240 and 340, fuel injector 540 does not use a common/shared air source to flow air through air holes 162 and to atomize liquid fuel. Consequently, the flow of air through gas inlet 442 and air holes 162 is not linked and, when fuel injector 540 is used in fuel system 30, can be adjusted independently by controller 32.

Figure 8:
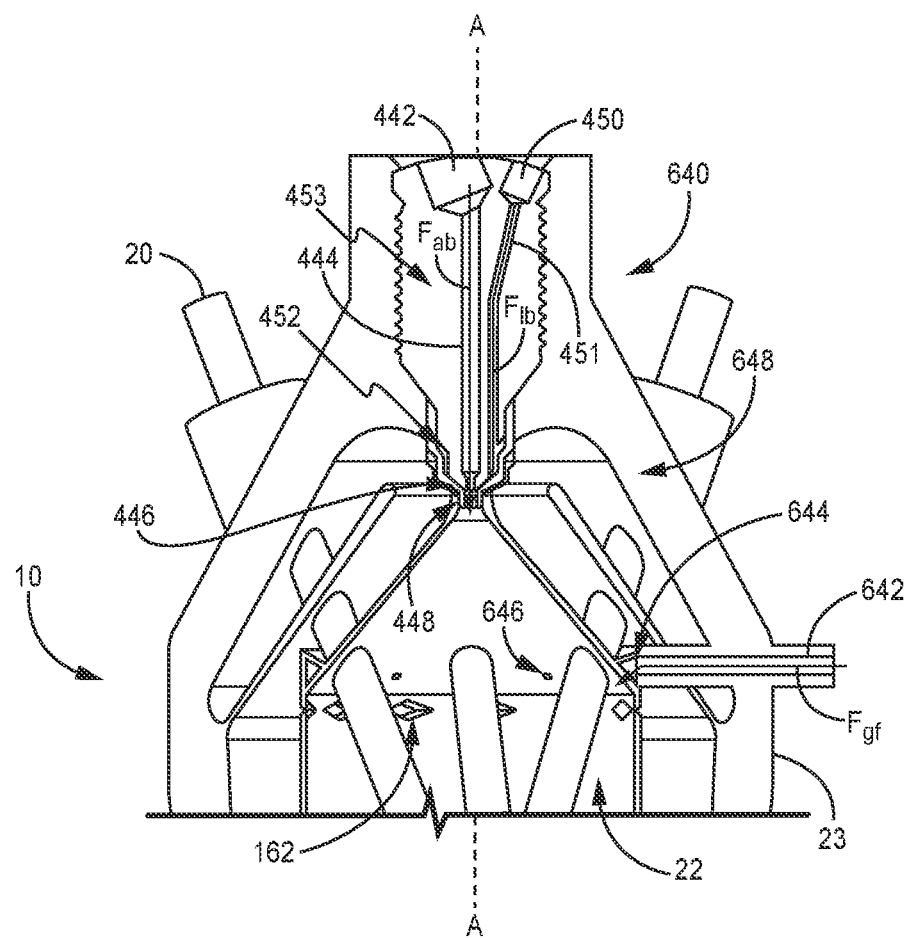
FIG. 8 is a cross-sectional view of an alternative example of a fuel system for the torch igniter of FIG. 1 or 2.

FIG. 8 is a cross-sectional view of fuel injector 640, which is arranged substantially similarly to fuel injector 540, except for fuel flow path $F_{gf}$. Fuel injector 640 flows gaseous fuel according to flow path $F_{gf}$. Fuel enters fuel injector 640 at fuel channel 642, which extends transverse to axis A-A through an outer wall of housing 23. Fuel channel 642 flows gaseous fuel to swirling annulus 644, which is embedded in housing 23 and centered on axis A-A. Swirling annulus 644 imparts gaseous fuel with a swirl relative to axis A-A as it enters combustion chamber 22, improving distribution of fuel throughout combustion chamber 22. Gaseous fuel enters combustion chamber 22 through fuel apertures 646, which extend at through housing 23 in cap region 648 and at an angle with respect to axis A-A. Fuel apertures 646 flow gaseous fuel to impinge on surface igniters 20, creating combustion gases within combustion chamber 22.

Figure 9:
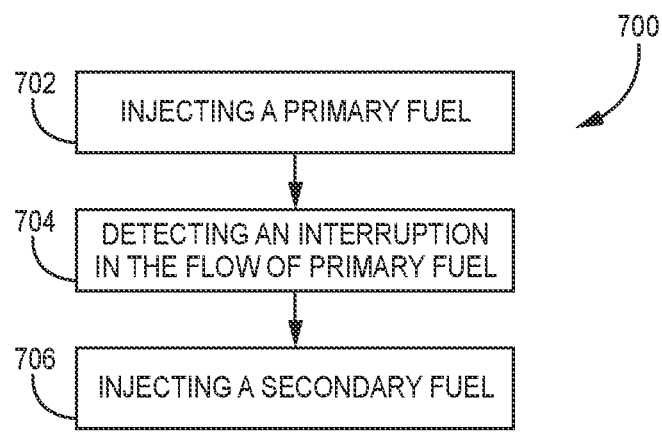
FIG. 9 is a flow diagram an example of a method for delivering fuel to a torch igniter.

FIG. 9 is a flow diagram of method 700 of switching fuel used in a torch igniter in the combustion section of the gas turbine engine. Method 700 can be used with system 30, torch igniter 10, and any of fuel injector systems 140, 240, 340, 440, 540, and 640. FIG. 9 has steps of injecting a primary fuel (step 702), detecting an interruption in primary fuel flow (step 704), and injecting a secondary fuel backup (step 706).

In step 702, a primary fuel is injected into a combustion chamber of the torch igniter. The primary fuel is generally a gaseous fuel, but can be a liquid fuel in some examples. The gaseous fuel can be, for example, natural gas, hydrogen, ammonia, liquid hydrogen, syngas, or a blend of any of the aforementioned fuels. The liquid fuel can be, for example, conventional diesel, biodiesel, kerosene, naphtha, or a blend of any of the aforementioned fuels. Delivery of liquid fuel can be accompanied by a flow of air from a compressed air source to atomize the liquid fuel before it is combusted. The primary fuel is supplied by a primary fuel source and is injected so that it impinges on an ignition source, such as a hot surface igniter. Generally, the flow of primary fuel is controlled by a controller, such as an ECU or FADEC, that can control the rate that gaseous fuel flows into the combustion chamber. After initial ignition of the primary fuel, the primary fuel can continue to be injected into the combustion chamber so that the torch igniter remains continuously lit. Continued injection of the primary fuel can be used to create a self-sustaining flame.

In step 704, an interruption in the flow of primary fuel is detected. The interruption can be planned or unplanned. A planned interruption can occur when, for example, an operator of the gas turbine engine wishes to switch fuels supplied to the torch igniter. For example, an operator of the gas turbine engine can use a user interface connected to the controller to change fuel used by the torch igniter. The controller can receive the operator's input at the user interface and interrupt the flow of primary fuel to the torch igniter. In other examples, the controller can be configured to supply the same type of fuel to the torch igniter and a main combustor of the gas turbine engine. The operator of the gas turbine engine can use the user interface to change the fuel used by the combustor, causing the controller to interrupt the supply of primary fuel to the torch igniter. An unplanned interruption can occur, for example, due to an unexpected loss of primary fuel from a primary fuel source. The controller can detect an unplanned interruption by, for example, a sensor disposed in a fluid flow path carrying the primary fuel.

In step 706, a secondary fuel is injected into the combustion chamber of the torch igniter. Generally, the controller initiates injection of the secondary fuel into the combustion chamber as soon as the interruption of the flow of primary fuel is detected. Rapidly switching between fuel sources allows the torch igniter to remain continuously lit with a self-sustaining flame even in the event of an unexpected loss of primary fuel from the primary fuel source.

In at least some examples, torch igniter 10 or any of fuel injector systems 140, 240, 340, 440, 540, and 640 are formed monolithically. More generally, all components of any torch igniter disclosed herein can be formed partially or entirely by additive manufacturing. For metal components (e.g., Inconel, aluminum, titanium, etc.) exemplary additive manufacturing processes include but are not limited to powder bed fusion techniques such as direct metal laser sintering (DMLS), laser net shape manufacturing (LNSM), electron beam manufacturing (EBM). Additive manufacturing is particularly useful in obtaining unique geometries (e.g., swirling channel 164, swirling annulus 250, swirling annulus 350, channel 542, or swirling annulus 644) and for reducing the need for welds or other attachments (e.g., between any of fuel injector systems 140, 240, 340, 440, 540, or 640 and torch igniter 10 or housing 23). However, other suitable manufacturing process can be used. For example, any or any of fuel injectors 140, 240, 340, 440, 540, or 640 can be fabricated separately and joined via later manufacturing steps to form torch igniter 10. Similarly, in some examples, flow divider 154 or annular channel 452 can in some examples be fabricated separately and joined via later manufacturing steps (e.g., brazing, welding, or compression fitting) to form a torch igniter or fuel injector described herein.

In all embodiments described herein, torch igniter 10 is capable of providing a flame for combustor ignition using multiple fuel sources, improving the fuel flexibility of torch igniter 10 and thereby allowing torch igniter 10 to use the same varieties and types of fuels as combustor 24. Further, all embodiments of torch igniter 10 described herein are able to rapidly switch fuel sources. This allows torch igniter 10 to continuously operate with a self-sustaining flame during automated fuel switching, such as after an unplanned fuel outage, and operator-initiated fuel switching.

Discussion of Possible Embodiments

The following are non-exclusive descriptions of possible embodiments of the present invention:

An embodiment of a torch igniter system for a combustor of a gas turbine engine includes a housing defining a combustion chamber, an ignition source disposed at least partially in the combustion chamber, a fuel injector, a first fluid path connecting a first fuel source to the fuel injector, a second fluid path connecting an air source to the fuel injector, and a third fluid path connecting a second fuel source to the combustion chamber. The fuel injector is configured to inject fuel, air, or a mixture of fuel and air into the combustion chamber and to impinge on the ignition source.

The torch igniter system of the preceding paragraph can optionally include, additionally and/or alternatively, any one or more of the following features, configurations and/or additional components:

A torch igniter system for a combustor of a gas turbine engine includes a housing defining a combustion chamber, an ignition source disposed at least partially in the combustion chamber, a fuel injector, a first fluid path connecting a first fuel source to the fuel injector, a second fluid path connecting an air source to the fuel injector, and a third fluid path connecting a second fuel source to the combustion chamber. The fuel injector is configured to inject fuel, air, or a mixture of fuel and air into the combustion chamber and to impinge on the ignition source.

A further embodiment of the foregoing torch igniter system, wherein a portion of the second fluid path overlaps the third fluid path.

A further embodiment of any of the foregoing torch igniter systems, further comprising an inner wall of the fuel injector that defines an internal volume of the fuel injector, a flow divider disposed within the internal volume of the fuel injector, a tip aperture disposed between the combustion chamber and the flow divider, a channel that extends through the flow divider and connects the second fluid path and third fluid path to the tip aperture, an annular volume formed between the flow divider and the inner wall that connects the first fluid path to the tip aperture.

A further embodiment of any of the foregoing torch igniter systems, wherein the first fluid path, second fluid path, and third fluid path overlap within the tip aperture.

A further embodiment of any of the foregoing torch igniter systems, wherein the housing is annular and extends along an axis.

A further embodiment of any of the foregoing torch igniter systems, further comprising an annular channel embedded within the housing and centered on the axis, wherein the annular channel is fluidly connected to the second fuel source and the third fluid path includes the annular channel.

A further embodiment of any of the foregoing torch igniter systems, further comprising an aperture extending through an inner wall of the housing that connects the annular channel to the combustion chamber, wherein the aperture extends transverse to the axis and the third fluid path includes the aperture.

A further embodiment of any of the foregoing torch igniter systems, further comprising a cap formed by the housing disposed at an axial end of the torch igniter, wherein the cap receives the fuel injector.

A further embodiment of any of the foregoing torch igniter systems, further comprising an annular channel embedded within the cap and centered on the axis, wherein the annular channel is fluidly connected to the second fuel source and the third fluid path includes the annular channel.

A further embodiment of any of the foregoing torch igniter systems, further comprising an aperture extending through an inner wall of the housing that connects the annular channel to the combustion chamber, wherein the aperture is embedded in the cap and the third fluid path includes the aperture.

A further embodiment of any of the foregoing torch igniter systems, wherein the ignition source is a glow plug.

A further embodiment of any of the foregoing torch igniter systems, further comprising a controller to control flow from the first fuel source, flow from the second fuel source, and flow from the air source.

A further embodiment of any of the foregoing torch igniter systems, wherein the controller is configured to deliver fuel from the second fuel source to the combustion chamber, detect an interruption in the delivery of the fuel from the second fuel source, and deliver fuel from the first fuel source and air from the air source to the combustion chamber after detecting the interruption.

A further embodiment of any of the foregoing torch igniter systems, wherein the first fuel source is configured to supply a liquid fuel and the second fuel is configured to supply a gaseous fuel.

A further embodiment of any of the foregoing torch igniter systems, wherein the first and second fuel sources are configured to supply gaseous fuels.

A further embodiment of any of the foregoing torch igniter systems, wherein the first and second fuel sources configured to supply liquid fuels.

An embodiment of a torch igniter for a combustor of a gas turbine engine includes a housing defining a combustion chamber, an ignition source disposed at least partially in the combustion chamber, a fuel injector configured to inject a first fluid into the combustion chamber to impinge on the ignition source, a first fluid channel connected to the fuel injector, an aperture extending at least partially through the housing and configured to inject a second fluid into the combustion chamber to impinge on the ignition source, and a second fluid channel connected to the aperture.

The torch igniter of the preceding paragraph can optionally include, additionally and/or alternatively, any one or more of the following features, configurations and/or additional components:

A torch igniter for a combustor of a gas turbine engine includes a housing defining a combustion chamber, an ignition source disposed at least partially in the combustion chamber, a fuel injector configured to inject a first fluid into the combustion chamber to impinge on the ignition source, a first fluid channel connected to the fuel injector, an aperture extending at least partially through the housing and configured to inject a second fluid into the combustion chamber to impinge on the ignition source, and a second fluid channel connected to the aperture.

A further embodiment of the foregoing torch igniter, wherein the housing is annular and extends along an axis.

A further embodiment of any of the foregoing torch igniters, wherein the second channel includes an annular portion embedded within the housing and centered on the axis, the annular portion is directly fluidly connected to the aperture, and the aperture extends transverse to the axis.

A further embodiment of any of the foregoing torch igniters, further comprising a cap formed by the housing disposed at an axial end of the torch igniter.

A further embodiment of any of the foregoing torch igniters, wherein the fuel injector is received at the cap, the second channel includes an annular portion embedded within the cap and centered on the axis, and the annular portion is directly fluidly connected to the aperture.

A further embodiment of any of the foregoing torch igniters, wherein the ignition source is a glow plug.

A further embodiment of any of the foregoing torch igniters, wherein the first fluid is a liquid fuel and the second fluid is a gaseous fuel.

A further embodiment of any of the foregoing torch igniters, wherein the first and second fluids are gaseous fuels.

A further embodiment of any of the foregoing torch igniters, wherein the first and second fluids are liquid fuels.

An embodiment of a method of switching fuels delivered to a torch igniter for a combustor of a gas turbine engine includes delivering a first fuel to a combustion chamber along a first flow path, creating a flame within the combustion chamber by impinging the first fuel on an ignition source, detecting an interruption in the delivery of the first fuel, delivering a second fuel to the combustion chamber along a second flow path after detecting the interruption, and igniting the second fuel with the flame in the combustion chamber. The combustion chamber is defined by a housing.

The method of the preceding paragraph can optionally include, additionally and/or alternatively, any one or more of the following features, configurations and/or additional components:

A method of switching fuels delivered to a torch igniter for a combustor of a gas turbine engine includes delivering a first fuel to a combustion chamber along a first flow path, creating a flame within the combustion chamber by impinging the first fuel on an ignition source, detecting an interruption in the delivery of the first fuel, delivering a second fuel to the combustion chamber along a second flow path after detecting the interruption, and igniting the second fuel with the flame in the combustion chamber. The combustion chamber is defined by a housing.

A further embodiment of the foregoing method, wherein the first fuel is a gaseous fuel and the second fuel is a liquid fuel.

A further embodiment of any of the foregoing methods, wherein the first and second fuels are gaseous fuels.

A further embodiment of any of the foregoing methods, wherein the first and second fuels are liquid fuels.

A further embodiment of any of the foregoing methods, wherein at least one of the first and second fuels is delivered by a fuel injector received by the housing.

A further embodiment of any of the foregoing methods, wherein at least one of the first and second fuels is delivered through an aperture in the housing.

A further embodiment of any of the foregoing methods, further comprising delivering air along the first flow path while delivering the second fuel along the second flow path.

A further embodiment of any of the foregoing methods, wherein the second fuel and air are delivered to an injector, the second fuel is a liquid fuel, and the injector is configured to atomize the liquid fuel with the air.

A further embodiment of any of the foregoing methods, further comprising selecting the second fuel with a user interface connected to a controller.

A further embodiment of any of the foregoing methods, further comprising causing the interruption of the delivery of the first fuel with the controller.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A torch igniter system for a combustor of a gas turbine engine, the torch igniter system comprising:
   a housing defining a combustion chamber;
   an ignition source disposed at least partially in the combustion chamber;
   a fuel injector configured to inject at least one of fuel and air into the combustion chamber and to impinge on the ignition source;
   a first fluid path connecting a first fuel source to the fuel injector;
   a second fluid path connecting an air source to the fuel injector;
   a third fluid path connecting a second fuel source to the combustion chamber;
   an inner wall of the fuel injector, the inner wall defining an internal volume of the fuel injector;
   a flow divider disposed within the internal volume of the fuel injector and configured to separate fluid flow through the first fluid path from fluid flow through the second fluid path and the third fluid path;
   a mixing annulus for atomizing a first fuel from the first fuel source, the mixing annulus defined by the inner wall of the fuel injector and disposed adjacent to the flow divider;
   a tip aperture disposed between the combustion chamber and the mixing annulus, wherein the first fluid path, second fluid path, and third fluid path flow sequentially through the mixing annulus and the tip aperture to the combustion chamber;
   a channel that extends through an inner portion of the flow divider and connects the second fluid path and third fluid path to the tip aperture, such that air from the air source flowing along the second fluid path atomizes the first fuel flowing along the first fluid path in the mixing annulus; and
   an annular volume formed between an outer surface of the flow divider and the inner wall, the annular volume connecting only the first fluid path to the tip aperture such that the second and third fluid paths do not include the annular volume;
   wherein a portion of the second fluid path is coextensive with a portion of the third fluid path upstream of the flow divider.

2. The torch igniter system of claim 1, wherein the housing is annular and extends along an axis.

3. The torch igniter system of claim 1, wherein the ignition source is a glow plug.

4. The torch igniter system of claim 1, further comprising a controller to control flow from the first fuel source, flow from the second fuel source, and flow from the air source.

5. The torch igniter system of claim 4, wherein the controller is configured to:
   deliver the second fuel from the second fuel source to the combustion chamber;
   detect an interruption in the delivery of the second fuel from the second fuel source; and
   deliver the first fuel from the first fuel source and the air from the air source to the combustion chamber after detecting the interruption.

6. A method of switching fuels delivered to a torch igniter system for a combustor of a gas turbine engine, the torch igniter system comprising:
a housing defining a combustion chamber;
an ignition source disposed at least partially in the combustion chamber;
a fuel injector configured to inject at least one of fuel and air into the combustion chamber and to impinge on the ignition source;
a first fluid path connecting a first fuel source to the fuel injector;
a second fluid path connecting an air source to the fuel injector;
a third fluid path connecting a second fuel source to the combustion chamber;
an inner wall of the fuel injector, the inner wall defining an internal volume of the fuel injector;
a flow divider disposed within the internal volume of the fuel injector and configured to separate fluid flow through the first fluid path from fluid flow through the second fluid path and the third fluid path;
a mixing annulus for atomizing a first fuel from the first fuel source, the mixing annulus defined by the inner wall of the fuel injector and disposed adjacent to the flow divider;
a tip aperture disposed between the combustion chamber and the mixing annulus, wherein the first fluid path, second fluid path, and third fluid path flow sequentially through the mixing annulus and the tip aperture to the combustion chamber;
a channel that extends through an inner portion of the flow divider and connects the second fluid path and third fluid path to the tip aperture, such that air from the air source flowing along the second fluid path atomizes the first fuel flowing along the first fluid path in the mixing annulus; and
an annular volume formed between an outer surface of the flow divider and the inner wall, the annular volume connecting only the first fluid path to the tip aperture such that the second and third fluid paths do not include the annular volume;
wherein a portion of the second fluid path is coextensive with a portion of the third fluid path upstream of the flow divider;
the method comprising:
delivering a second fuel from the second fuel source to the combustion chamber along the third fluid path,
creating a flame within the combustion chamber by impinging the second fuel on the ignition source;
detecting an interruption in the delivery of the second fuel;
delivering the first fuel from the first fuel source to the combustion chamber along the first fluid path after detecting the interruption;
delivering the air from the air source along the second fluid path while delivering the first fuel along the first fluid path;
atomizing the first fuel with the air in the mixing annulus; and
igniting the first fuel with the flame in the combustion chamber.

7. The method of claim 6, wherein at least one of the first and second fuels is delivered by the fuel injector received by the housing.

8. The method of claim 6, wherein at least one of the first and second fuels is delivered through an aperture in the housing.

9. The method of claim 6, wherein the firs fuel and the air are delivered to the fuel injector, the first fuel is a liquid fuel, and the fuel injector is configured to atomize the liquid fuel with the air.

10. The method of claim 6, further comprising: selecting the first fuel with a user interface connected to a controller; and causing the interruption of the delivery of the second fuel with the controller.

* * * * *